(12) United States Patent
Perlas et al.

(10) Patent No.: US 8,780,491 B1
(45) Date of Patent: Jul. 15, 2014

(54) METHOD OF IMBALANCE CORRECTION USING A GROOVED DISK CLAMP

(71) Applicant: Western Digital Technologies, Inc., Irvine, CA (US)

(72) Inventors: Joseph A. Perlas, San Jose, CA (US); Jambunathan Vangal-Ramamurthy, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/672,668

(22) Filed: Nov. 8, 2012

(51) Int. Cl.
*G11B 17/02* (2006.01)
(52) U.S. Cl.
USPC ............................................ 360/98.07
(58) Field of Classification Search
CPC .......................... G11B 17/0281; G11B 25/043
USPC ................ 360/98.07, 99.08, 99.12, 133, 137; 310/67 R, 51
See application file for complete search history.

(56) References Cited

U.S. PATENT DOCUMENTS

| | | | |
|---|---|---|---|
| 5,111,713 A * | 5/1992 | Cameron et al. | 74/571.1 |
| 5,130,870 A | 7/1992 | Jabbari | |
| 5,391,952 A | 2/1995 | Simazu et al. | |
| 6,178,062 B1 | 1/2001 | Yim et al. | |
| 6,243,351 B1 * | 6/2001 | Huang | 720/702 |
| 6,356,409 B1 * | 3/2002 | Price et al. | 360/98.07 |
| 6,492,750 B2 * | 12/2002 | Kikuchi et al. | 310/51 |
| 6,711,116 B2 * | 3/2004 | Masaki et al. | 720/702 |
| 6,711,117 B1 * | 3/2004 | Kanbe | 720/701 |
| 6,731,588 B2 * | 5/2004 | Han | 369/264 |
| 6,834,393 B2 * | 12/2004 | Akimaru et al. | 720/698 |
| 6,915,527 B2 | 7/2005 | Liao et al. | |
| 7,434,240 B2 * | 10/2008 | Yoo et al. | 720/702 |
| 7,630,171 B2 | 12/2009 | Lee et al. | |
| 7,656,609 B1 * | 2/2010 | Berding et al. | 360/99.08 |
| 7,814,506 B2 * | 10/2010 | Kim | 720/702 |
| 7,911,092 B2 * | 3/2011 | Kim | 310/67 R |
| 2007/0263321 A1 | 11/2007 | Chan et al. | |

* cited by examiner

*Primary Examiner* — Angel Castro

(57) ABSTRACT

A disk clamp that can engage a disk hub to couple a disk media to a disk hub, the disk clamp having a body portion, and a groove formed in a surface of the body portion and extending at least in a circumferential direction substantially parallel to at least a portion of the circumference of the disk clamp; and a balance weight installed in the groove formed in the surface of the disk clamp, the balance weight having a quantity of material applied in the groove. A disk drive assembly using the disk hub and a method of correcting a drive imbalance using the disk hub.

24 Claims, 10 Drawing Sheets

METHOD OF IMBALANCE CORRECTION USING A GROOVED DISK CLAMP

FIELD

The present disclosure relates generally to information storage devices, and in particular to a disk drive having a disk clamp having a groove formed therein and a method of imbalance correction using the grooved disk clamp.

BACKGROUND

Disk drives typically include a disk clamp that provides a disk clamping force for holding one or more disks to a hub. Thus, disk clamping is becoming more and more important not only for regular Hard Disk Drives (HDD) performance but also under extreme conditions such as operational shock and non-operational shock. A reliable clamping force may maintain the integration of the whole disk pack, preventing the disk from separating or sliding under shock event.

Figure 1A:
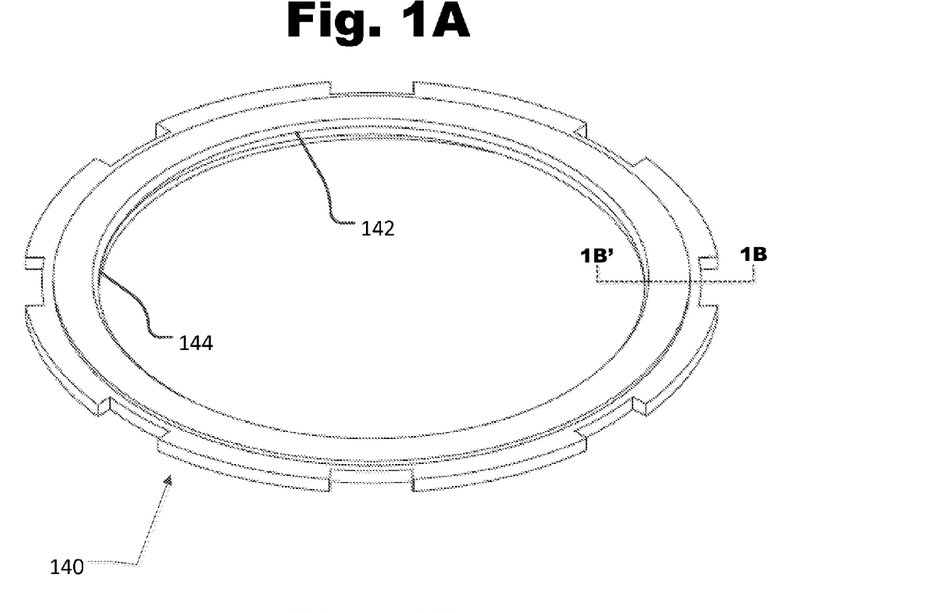
FIG. 1A is perspective view illustrating a related disk clamp 140 for use in a hard disk drive assembly.
Figure 1B:
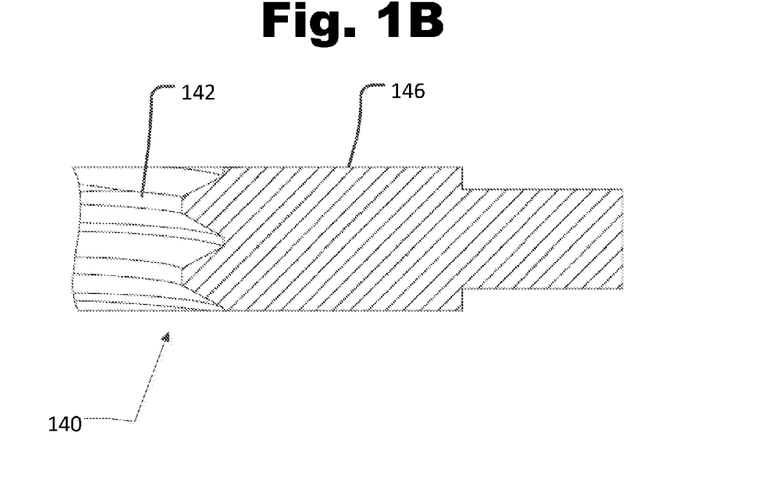
FIG. 1B is a cross-section view of the related disk clamp 140 taken along line 1B-1B'.

FIGS. 1A and 1B show perspective and cross-sectional views of a related clamp 140 that could be used to provide clamping force. The clamp 140 has an annular shape and one or more threads 142 formed on a radially interior region 144 of the clamp. As shown in FIG. 1B, the clamp 140 also has a flat upper surface 146.

Further, to reduce data streaming issues and vibrations during operation imbalances of the disk pack must be within certain imbalance tolerances. In order to correct or compensate for imbalance in the disk pack, plugs or wire pieces various size or shape may be inserted into holes provided in the disk hub to correct the mass distribution of the disk pack.

However, with decreasing form factors and tighter imbalance correction specifications, the effectiveness of using plugs or wire pieces inserted into holes provided in the disk hub to correct imbalance of the whole disk pack has been reduced.

There is therefore a need for an improved disk clamp design and imbalance correction method.

BRIEF DESCRIPTION OF THE DRAWINGS

A general architecture that implements the various features of the disclosure will now be described with reference to the drawings. The drawings and the associated descriptions are provided to illustrate embodiments of the disclosure and not to limit the scope of the disclosure. Throughout the drawings, reference numbers are reused to indicate correspondence between referenced elements.

DETAILED DESCRIPTION

Figure 2:
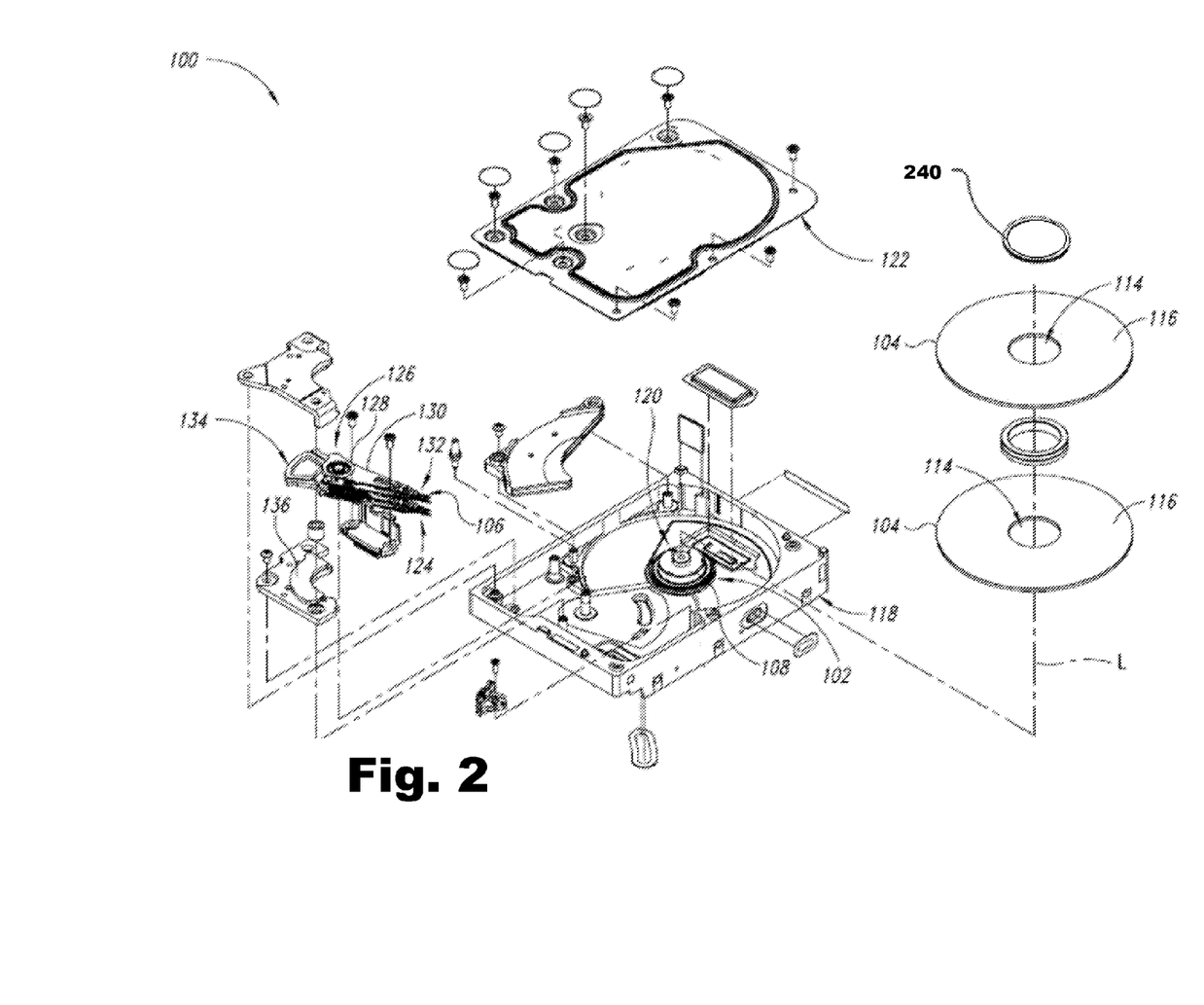
FIG. 2 is an exploded, perspective view generally illustrating a disk drive including an example clamp 240 according to one or more embodiments.

Referring to FIG. 2, a disk drive 100 is illustrated, according to one embodiment. The disk drive 100 comprises a hub 102, a disk 104 physically contacting and supported by at least one mounting surface (not labeled in FIG. 2) of the hub 102, and a head 106 operable to write to and read from the disk 104. In one embodiment, the hub 102 comprises a substantially cylindrical portion 108 which define a longitudinal axis L and a mounting surface (not labeled in FIG. 2) substantially normal to the longitudinal axis L, the mounting surface (not labeled in FIG. 2) extending radially outward.

As illustrated herein, the disk drive 100 comprises a magnetic disk drive, and the structures and methods described herein will be described in terms of such a disk drive. However, these structures and methods may also be applied to and/or implemented in other disk drives, including, e.g., optical and magneto-optical disk drives.

The disks 104 may comprise any of a variety of magnetic or optical disk media having a substantially concentric opening 114 defined there through. Of course, in other embodiments, the disk drive 100 may include more or fewer disks. For example, the disk drive 100 may include one disk or it may include two or more disks. The disks 104 each include a disk surface 116, as well as an opposing disk surface not visible in FIG. 2. In one embodiment, the disk surfaces 116 comprise a plurality of generally concentric tracks for storing data.

As illustrated, the hub 102 may be coupled to and support the disks 104. The hub 102 may also be rotatably attached to a motor base 118 of the disk drive 100, and may form one component of a motor 120 (e.g., a spindle motor). The motor 120 and the hub 102 may be configured to rotate the disks 104 about the longitudinal axis L.

Further, a disk clamp 240 may be coupled to the hub 102 to provide a downward clamping force to the disks 104. Specifically, the disk clamp 240 may be positioned above the disks 104 and attached to the hub 102.

The disk drive 100 may further include a cover 122, which, together with the motor base 118, may house the disks 104 and the motor 120. The disk drive 100 may also include a head stack assembly ("HSA") 124 rotatably attached to the motor base 118. The HSA 124 may include an actuator 126 comprising an actuator body 128 and one or more actuator arms 130 extending from the actuator body 128. The actuator body 128 may further be configured to rotate about an actuator pivot axis.

One or two head gimbal assemblies ("HGA") 132 may be attached to a distal end of each actuator arm 130. Each HGA 132 includes a head 106 operable to write to and read from a corresponding disk 104. The HSA 124 may further include a coil 134 through which a changing electrical current is passed during operation. The coil 134 interacts with one or more magnets 136 that are attached to the motor base 118 to form a voice coil motor ("VCM") for controllably rotating the HSA 124.

The head 106 may comprise any of a variety of heads for writing to and reading from a disk 104. In magnetic recording applications, the head 106 may include an air bearing slider and a magnetic transducer that includes a writer and a read element. The magnetic transducer's writer may be of a longitudinal or perpendicular design, and the read element of the magnetic transducer may be inductive or magneto resistive. In optical and magneto-optical recording applications, the head may include a mirror and an objective lens for focusing laser light on to an adjacent disk surface.

The disk drive 100 may further include a printed circuit board ("PCB") (not shown). The PCB may include, inter alia, a disk drive controller for controlling read and write operations and a servo control system for generating servo control signals to position the actuator arms 130 relative to the disks 104.

Figure 3A:
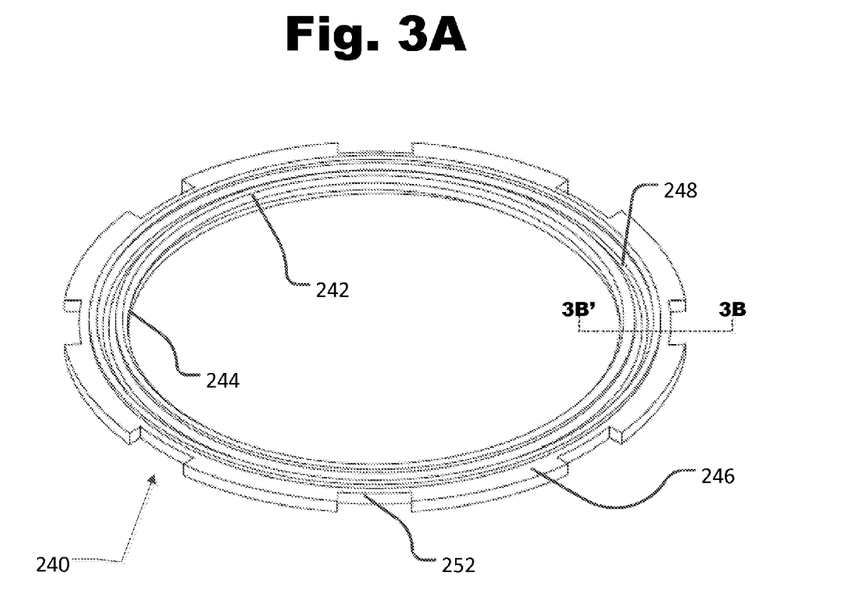
FIG. 3A is a perspective view illustrating a first example embodiment of a disk clamp 240 for use in a hard disk drive assembly of FIG. 2.

FIG. 3A is a perspective view illustrating a first example embodiment of a disk clamp 240 for use in a hard disk drive assembly of FIG. 2. Further, FIG. 3B is a cross-section view of the first example embodiment of a disk clamp 240 taken along line 3B-3B'.

As illustrated, the clamp 240 has body 246 having a substantially cylindrical or annular configuration. Threads 242 may be forms on a radially inner surface 244 of the body 246 of the clamp 240. These threads 242 may be configured to engage corresponding threads (not shown) performed on a disk hub 102 (shown in FIG. 2). In some embodiments, the body 246 also includes one or more notches 252 formed in a radially outer surface thereof.

Additionally, a groove 248 is formed in a surface of the body 246. As illustrated in FIG. 3A, the groove 248 extends in a circumferential direction substantially parallel to entire the circumference of the disk clamp 240. However, an exemplary embodiment is not limited to this configuration, and may instead extend substantially parallel to only a portion of the circumference of the disk clamp. In the example embodiment illustrated in FIG. 3B, the groove 248 has a quasi-V-shaped cross-section with angled sidewalls 254 and a substantially flat bottom 250. However as discussed below other example embodiments are not limited to this cross-section configuration.

Figure 3B:
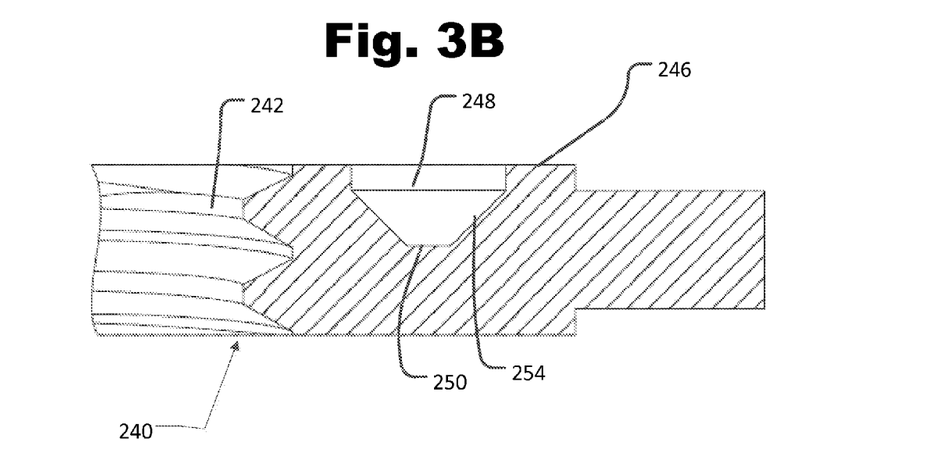
FIG. 3B is a cross-section view of the first example embodiment of a disk clamp 240 taken along line 3B-3B'.
Figure 4:
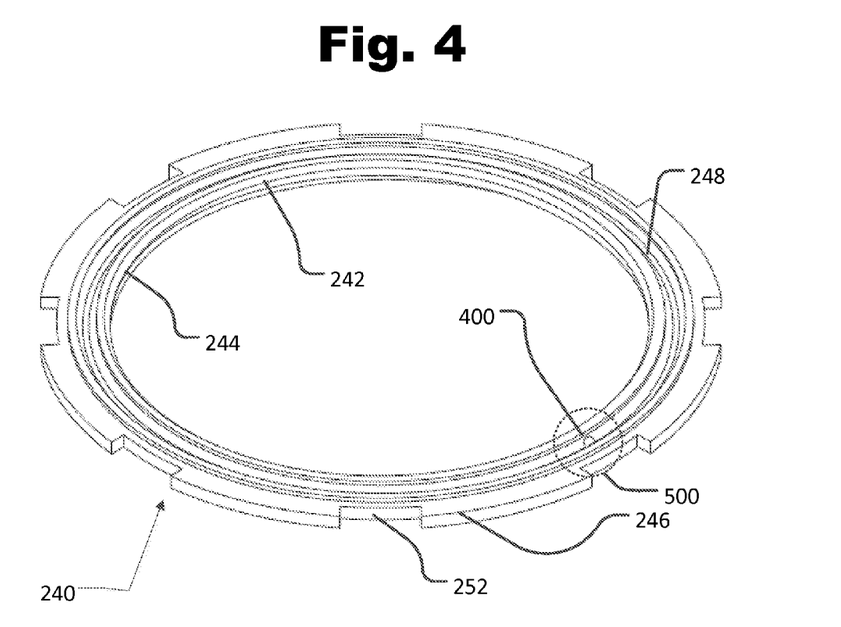
FIG. 4 is a perspective view of the first example embodiment of a disk clamp 240 with a quantity of material added for imbalance correction.
Figure 5:
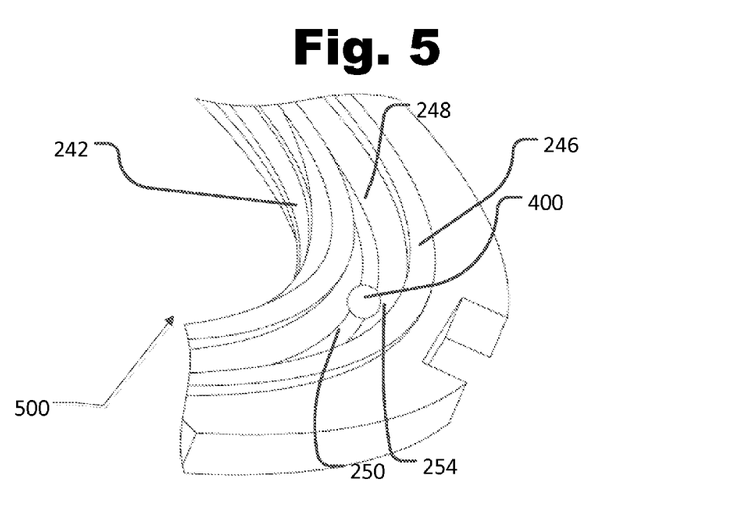
FIG. 5 is an enlarged perspective view of a portion 500 of the first example embodiment of a disk clamp 240 shown in FIG. 4 with the quantity of material added for imbalance correction.
Figure 6:
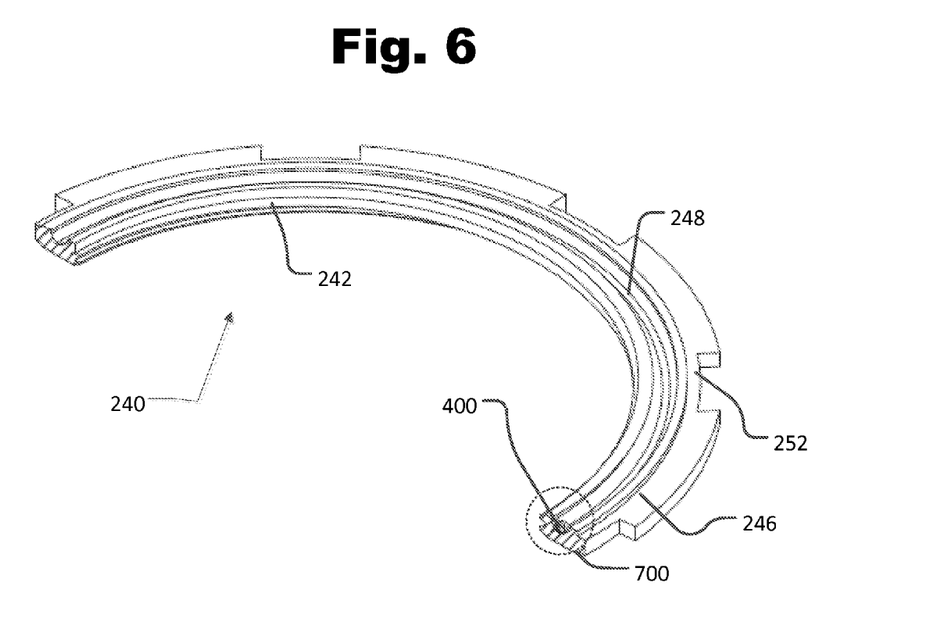
FIG. 6 is a perspective view of the first example embodiment of a disk clamp 240 with a quantity of material added for imbalance correction with the disk clamp cut in half to show a cross-section.
Figure 7:
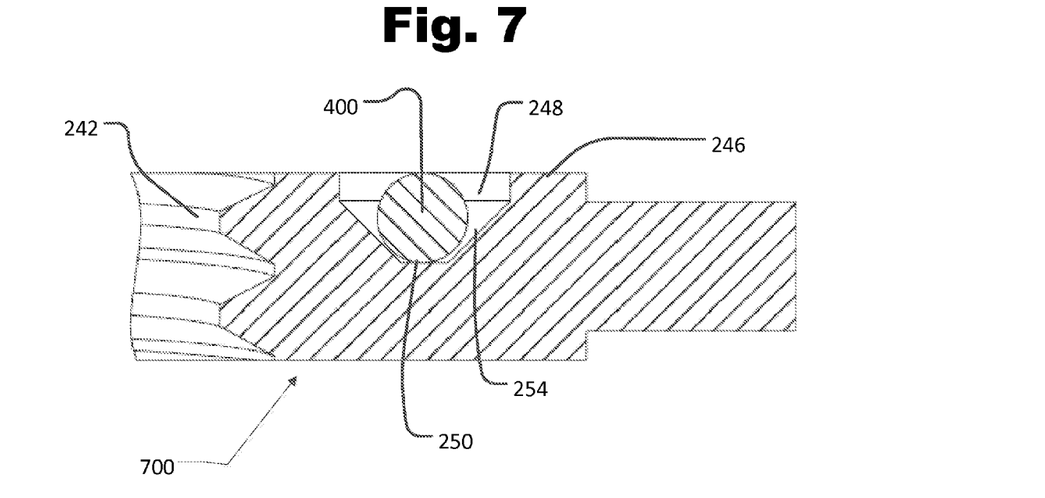
FIG. 7 is cross-sectional view of the first example embodiment of a portion 700 of a disk clamp 240 shown in FIG. 6 with the quantity of material with the disk clamp cut in half to show a cross-section.

FIG. 4 is a perspective view of the first example embodiment of a disk clamp 240 shown in FIGS. 3A and 3B with a quantity of material added for imbalance correction. FIG. 5 is an enlarged perspective view of a portion 500 of the first example embodiment of a disk clamp 240 shown in FIG. 4 with the quantity of material added for imbalance correction. FIG. 6 is a perspective view of the first example embodiment of a disk clamp 240 with a quantity of material added for imbalance correction with the disk clamp cut in half to show a cross-section. FIG. 7 is cross-sectional view of the first example embodiment of a portion 700 of a disk clamp 240 shown in FIG. 6 with the quantity of material with the disk clamp cut in half to show a cross-section.

As mentioned above, the clamp 240 is illustrated as having a body 246, threads 242 forms on a radially inner surface 244 of the body 246, and a groove 248 formed in a surface of the body 246. The groove 248 may be provided to allow balancing of a disk pack of a hard drive using the clamp 240. As shown in FIG. 4, a portion of material 400 has been inserted into the groove 248 to adjust the mass of the disk pack on which the clamp 240 is mounted so as to correct any imbalance in the assembled disk pack.

In the example embodiment of FIGS. 4-7, the portion of material 400 is shown as having a substantially spherical shape. However, an example embodiment is not limited to this particular structure and may include alternative structures such as a tear-dropped shaped structure or a hemi-spherical shaped structure. Additionally, in the example embodiment of FIGS. 4-7, the portion of material 400 is shown being positioned in the center of the groove 248 in contact with the flat bottom 250 of the groove 248. However, exemplary embodiments are not limited to this particular position, and the portion of material 400 may be positioned offset from the center of the groove in contact with one of the angled walls 254.

The portion of material 400 is also not limited to a particular material and may include any clean room approved materials, such as metallic materials, resins, plastics, and rubbers. Further, the method of adding the portion of material 400 is not particularly limited and may include providing molten material and allowing it to solidify in place, or placing a solid material piece, such as a metallic bearing and gluing the solid piece in place with an adhesive. The method of application of the portion of material 400 is discussed in more detail below.

Figure 8A:
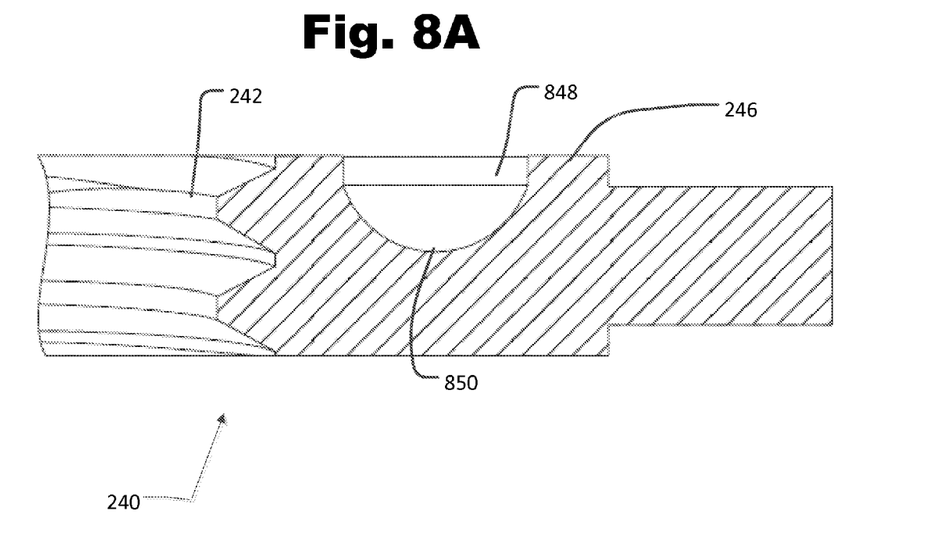
FIG. 8A is a cross-section view of a second example embodiment of a disk clamp 240 for use in a hard disk drive assembly of FIG. 2.
Figure 8B:
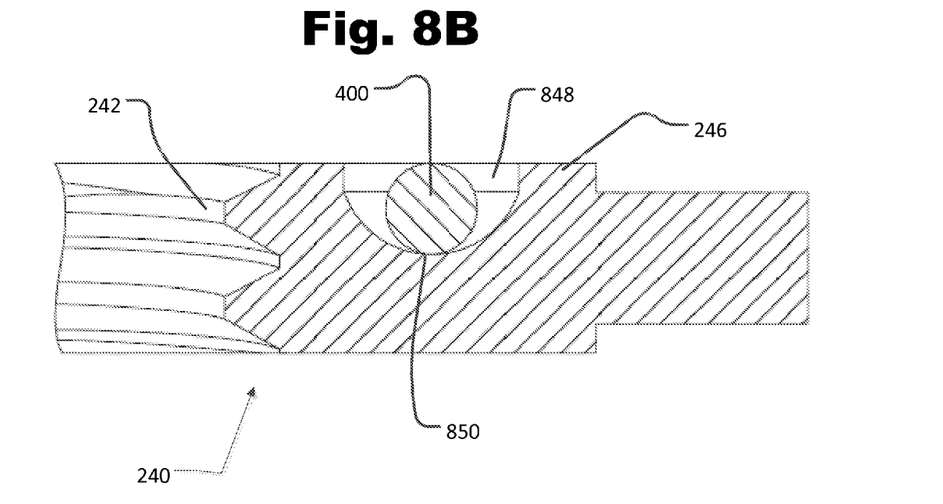
FIG. 8B is a cross-section view of the second example embodiment of a disk clamp 240 for use in a hard disk drive assembly of FIG. 2 with a quantity of material added for imbalance correction.

FIG. 8A is a cross-section view of a second example embodiment of a disk clamp 240 for use in a hard disk drive assembly of FIG. 2. FIG. 8B is a cross-section view of the second example embodiment of a disk clamp 240 for use in a hard disk drive assembly of FIG. 2 with a quantity of material added for imbalance correction.

This second example embodiment has some features similar to those of the first example embodiment discussed above and thus similar reference numerals are used. Specifically, the illustrated clamp 240 has a body 246 having a substantially cylindrical or annular configuration, threads 242 that may be forms on a radially inner surface 244 of the body 246 of the clamp 240. Again, these threads 242 may be configured to engage corresponding threads (not shown) formed on a disk hub 102 (shown in FIG. 2). Additionally, a groove 848 is formed in a surface of the body 246.

Like the first embodiment, the groove 848 in the second embodiment may extend in a circumferential direction substantially parallel to entire the circumference of the disk clamp 240. However, an exemplary embodiment of the present application is not limited to this configuration, and may instead extend substantially parallel to only a portion of the circumference of the disk clamp.

In the first example embodiment shown in FIGS. 3A, 3B, and 4-7, the groove 248 has a quasi-V-shaped cross-section with angled sidewalls 254 and a substantially flat bottom 250. However, as mentioned above, example embodiments of the present application is not limited to this configuration. For example, in the second example embodiment shown in FIGS. 8A and 8B, the groove 848 is formed to have a curved sidewall 850. Specifically, the groove 848 is shown to have a semicircular cross-section.

Additionally, FIG. 8B, illustrates that a portion of material 400 has been inserted into the groove 848 to adjust the mass of the disk pack on which the disk clamp 240 is mounted so as to correct any imbalance in the assembled disk pack. As in the first embodiment discussed above, the portion of material 400 in the second embodiment is shown as having a substantially spherical shape. However, an example embodiment is not limited to this particular structure and may include alternative structures such as a tear-drop shaped structure or a hemispherical shaped structure.

Additionally, in FIG. 8B, the portion of material 400 is shown being positioned in the center of the groove 848 in contact with the curved surface 850 of the groove 848. However, example embodiments are not limited to this particular position, and the portion of material 400 may be positioned in contact with the curved surface 840 of the groove 848 offset from the center of the groove.

Additionally, the portion of material 400 is also not limited to a particular material and may include any clean room approved materials, such as metallic materials, resins, plastics, and rubbers. Further, the method of adding the portion of material 400 is not particularly limited and may include providing molten material and allowing it to solidify in place, or placing a solid material piece, such as a metallic bearing and gluing the solid piece in place with an adhesive. The method of application of the portion of material 400 is discussed in more detail below.

Figure 9A:
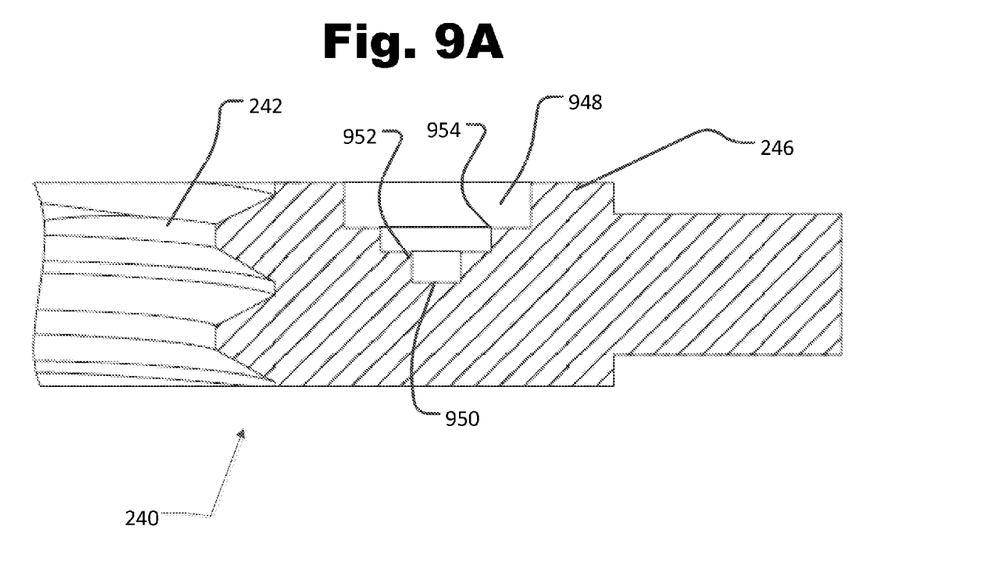
FIG. 9A is a cross-section view of a third example embodiment of a disk clamp 240 for use in a hard disk drive assembly of FIG. 2.
Figure 9B:
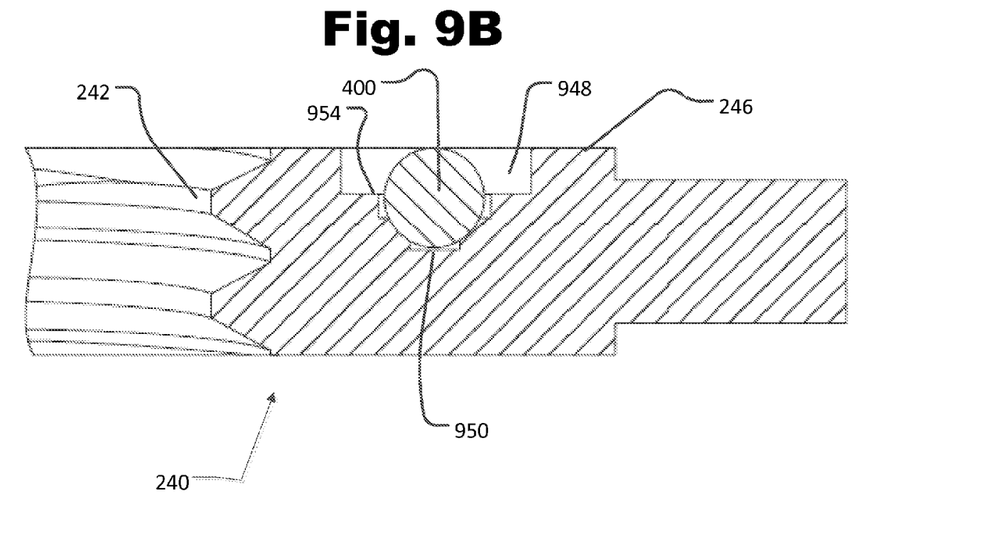
FIG. 9B is a cross-section view of the third example embodiment of a disk clamp 240 for use in a hard disk drive assembly of FIG. 2 with a quantity of material added for imbalance correction.

FIG. 9A is a cross-section view of a third example embodiment of a disk clamp 240 for use in a hard disk drive assembly of FIG. 2. FIG. 9B is a cross-section view of the third example embodiment of a disk clamp 240 for use in a hard disk drive assembly of FIG. 2 with a quantity of material added for imbalance correction.

This third example embodiment has some features similar to those of the first example embodiment discussed above and thus similar reference numerals are used. Specifically, the illustrated clamp 240 has a body 246 having a substantially cylindrical or annular configuration, threads 242 that may be forms on a radially inner surface 244 of the body 246 of the clamp 240. Again, these threads 242 may be configured to engage corresponding threads (not shown) formed on a disk hub 102 (shown in FIG. 2). Additionally, a groove 948 is formed in a surface of the body 246.

Like the first embodiment, the groove 948 in the third embodiment may extend in a circumferential direction substantially parallel to entire the circumference of the disk clamp 240. However, an exemplary embodiment of the present application is not limited to this configuration, and may instead extend substantially parallel to only a portion of the circumference of the disk clamp.

In the first example embodiment shown in FIGS. 3A, 3B, and 4-7, the groove 248 has a quasi-V-shaped cross-section with angled sidewalls 254 and a substantially flat bottom 250. However, as mentioned above, example embodiments of the present application are not limited to this configuration. For example, in the third example embodiment shown in FIGS. 9A and 9B, the groove 948 is formed to have a stepped-sidewall configuration having a flat bottom 950 and one or more steps 952, 954.

Additionally, FIG. 9B, illustrates that a portion of material 400 has been inserted into the groove 948 to adjust the mass of the disk pack on which the disk clamp 240 is mounted so as to correct any imbalance in the assembled disk pack. As in the first embodiment discussed above, the portion of material 400 in the third embodiment is shown as having a substantially spherical shape. However, an example embodiment is not limited to this particular structure and may include alternative structures such as a tear-drop shaped structure or a hemispherical shaped structure.

Additionally, in FIG. 9B, the portion of material 400 is shown being positioned in the center of the groove 948 in contact with one or more of the steps 952, 954 formed in the groove 848. However, example embodiments are not limited to this particular position, and the portion of material 400 may be positioned in contact with one or more of the steps 952, 954 offset from the center of the groove.

Additionally, the portion of material 400 is also not limited to a particular material and may include any clean room approved materials, such as metallic materials, resins, plastics, and rubbers. Further, the method of adding the portion of material 400 is not particularly limited and may include providing molten material and allowing it to solidify in place, or placing a solid material piece, such as a metallic bearing and gluing the solid piece in place with an adhesive. The method of application of the portion of material 400 is discussed in more detail below.

Figure 10A:
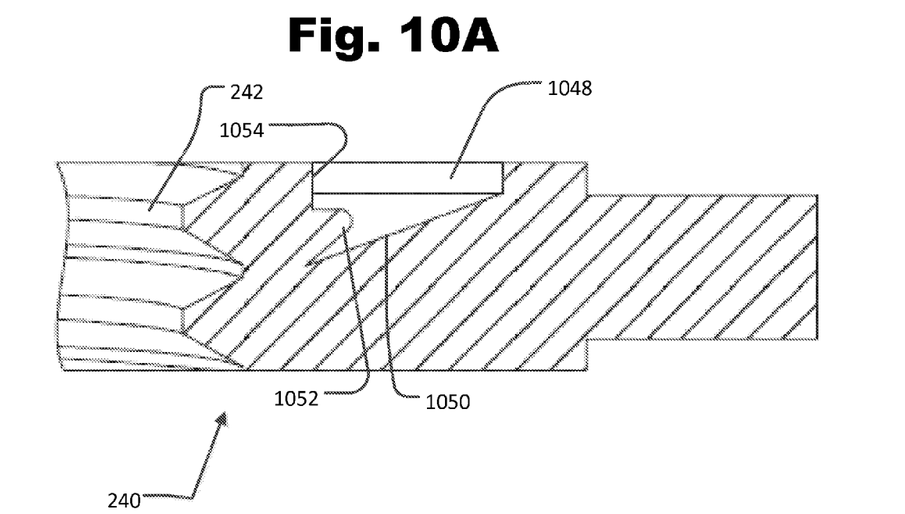
FIG. 10A is a cross-section view of a fourth example embodiment of a disk clamp 240 for use in a hard disk drive assembly of FIG. 2.
Figure 10B:
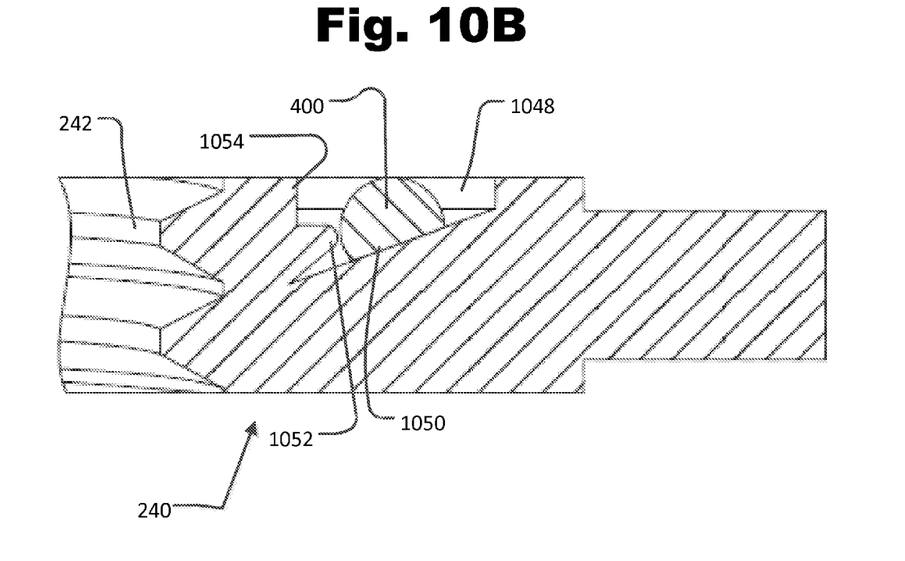
FIG. 10B is a cross-section view of the fourth example embodiment of a disk clamp 240 for use in a hard disk drive assembly of FIG. 2 with a quantity of material added for imbalance correction.

FIG. 10A is a cross-section view of a fourth example embodiment of a disk clamp 240 for use in a hard disk drive assembly of FIG. 2. FIG. 10B is a cross-section view of the fourth example embodiment of a disk clamp 240 for use in a hard disk drive assembly of FIG. 2 with a quantity of material added for imbalance correction.

This fourth example embodiment has some features similar to those of the first example embodiment discussed above and thus similar reference numerals are used. Specifically, the illustrated clamp 240 has a body 246 having a substantially cylindrical or annular configuration, threads 242 that may be forms on a radially inner surface 244 of the body 246 of the clamp 240. Again, these threads 242 may be configured to engage corresponding threads (not shown) formed on a disk hub 102 (shown in FIG. 2). Additionally, a groove 1048 is formed in a surface of the body 246.

Like the first embodiment, the groove 1048 in the fourth embodiment may extend in a circumferential direction substantially parallel to entire the circumference of the disk clamp 240. However, an exemplary embodiment of the present application is not limited to this configuration, and may instead extend substantially parallel to only a portion of the circumference of the disk clamp.

In the first example embodiment shown in FIGS. 3A, 3B, and 4-7, the groove 248 has a quasi-V-shaped cross-section with angled sidewalls 254 and a substantially flat bottom 250. However, as mentioned above, example embodiments of the present application are not limited to this configuration. For example, in the fourth example embodiment shown in FIGS. 10A and 10B, the groove 1048 is formed to have a saw-toothed cross-section with an inclined bottom 1050. Additionally, in some embodiments, a protruding member 1052 may extend toward the center of the groove from a sidewall 1054.

Additionally, FIG. 10B, illustrates that a portion of material 400 has been inserted into the groove 1048 to adjust the mass of the disk pack on which the disk clamp 240 is mounted so as to correct any imbalance in the assembled disk pack. As in the first embodiment discussed above, the portion of material 400 in the fourth embodiment is shown as having a substantially spherical shape. However, an example embodiment is not limited to this particular structure and may include alternative structures such as a tear-drop shaped structure or a hemi-spherical shaped structure.

Additionally, in FIG. 10B, the portion of material 400 is shown being positioned in the center of the groove 1048 in contact with the inclined bottom 1052 of the groove 1048. However, example embodiments are not limited to this particular position, and the portion of material 400 may be positioned offset from the center of the groove 1048.

Additionally, the portion of material 400 is also not limited to a particular material and may include any clean room approved materials, such as metallic materials, resins, plastics, and rubbers. Further, the method of adding the portion of material 400 is not particularly limited and may include providing molten material and allowing it to solidify in place, or placing a solid material piece, such as a metallic bearing and gluing the solid piece in place with an adhesive. The method of application of the portion of material 400 is discussed in more detail below.

Figure 11:
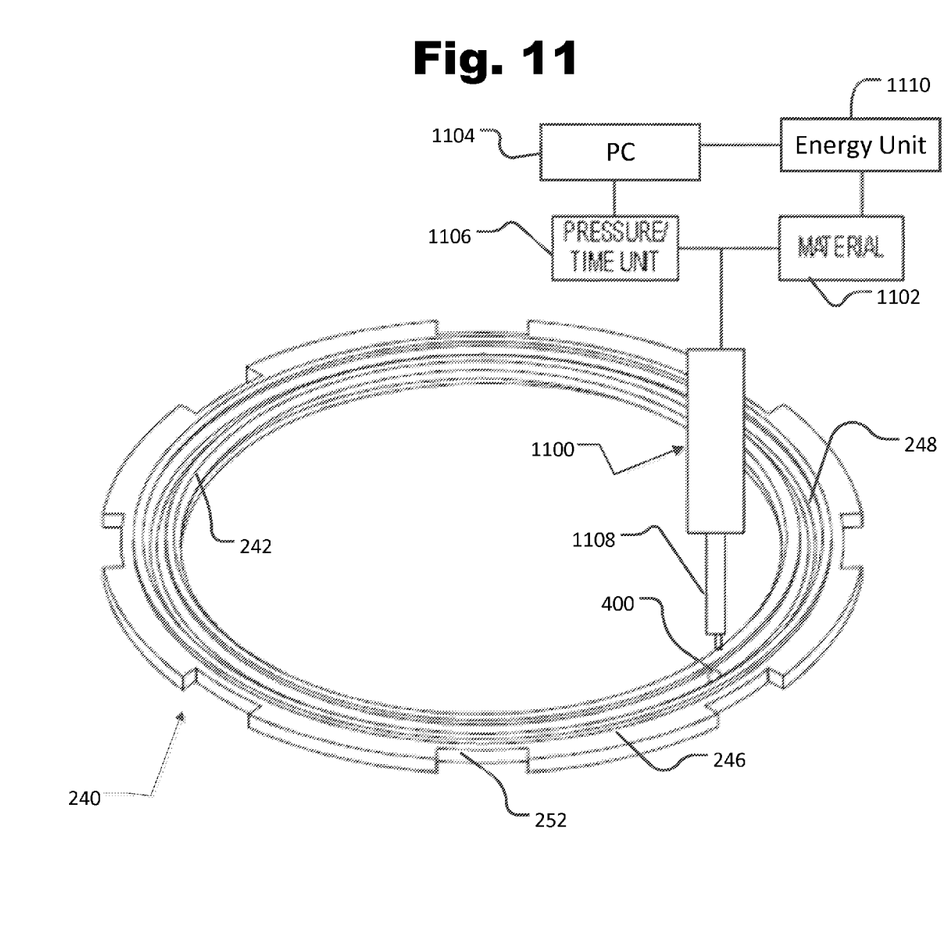
FIG. 11 is a perspective view illustrating an example apparatus applying the quantity of material to an example embodiment of a disk clamp 240 according to one embodiment.

FIG. 11 is a perspective view illustrating an example apparatus applying the quantity of material to an example embodiment of a disk clamp 240.

As illustrated, an apparatus 1100 for applying a quantity of material 400 to an example embodiment of the disk clamp 240 includes a supply material unit 1102, a control device (such as a PC or controller) 1104, a pressure/time unit 1106, and an injection nozzle 1108 from which the quantity of material 400 is supplied. Specifically, the control device 1104 is connected and controls the pressure/time unit 1106 and the supply material unit 1102. Further, the injection nozzle 1108 is also connected to the pressure/time unit 1106 and the supply material unit 1102. The control device 1104 causes the supply material unit 1102 to supply a predefined amount of material to the injection nozzle 1108 when the injection nozzle 1108 is positioned proximate to an area of the groove 248 of the clamp 240 to which the quantity of material 400 is to be provided. Further, the control device 1104 also causes the pressure/time unit 1106 pressure to the injection nozzle 1108 for a defined period of time such that the quantity of material provided by the supply material unit 1102 is propelled out of the injection nozzle 1108 and into the groove 248 of the clamp 240 to form the quantity of material 400.

Optionally, in some embodiments, the apparatus 1100 may also include an energy unit 1110 that provides energy to the material supply unit 1102 to melt the supply material into a molten state, prior to the supply material unit 1102 providing the quantity of material to the injection nozzle 1108. The energy unit 1110 may be a laser unit, heating unit, or any other type of unit that can be used to reduce a quantity of material to a molten state. In these embodiments, the supply material unit 1102 supplies the quantity of material in a molten state, which solidifies to form the quantity of material 400 in the groove the groove 248 of the clamp 240. By controlling the amount of material provided to the injection nozzle 1108, the pressure supplied by the pressure/time unit 1106, and the time over which the pressure is applied, the control unit 1104 may control the size of the quantity of material 400 injected into the groove 248. In some embodiments, the quantity of material 400 may be 100 microns in size.

However, the apparatus 1100 shown in FIG. 11 is not the only embodiment of an apparatus that can be used to provide quantity of material 400 into the groove 248 of the clamp 240. Further, the energy unit 1110 may be omitted in some embodiments. For example, an alternative apparatus may involve a movable XY stage that may place solid pieces of material into the groove 248, and a laser which causes the solid piece of material to become partially melted and secured in place. Further, another alternative apparatus may involve a movable XY stage that may place solid pieces of material into a portion of adhesive applied within the groove 248 by an injection nozzle similar to injection nozzle 1108, allowing the adhesive to hold the solid piece of material in place. Other alternative apparatuses may be apparent to a person of ordinary skill in the art.

Figure 12:
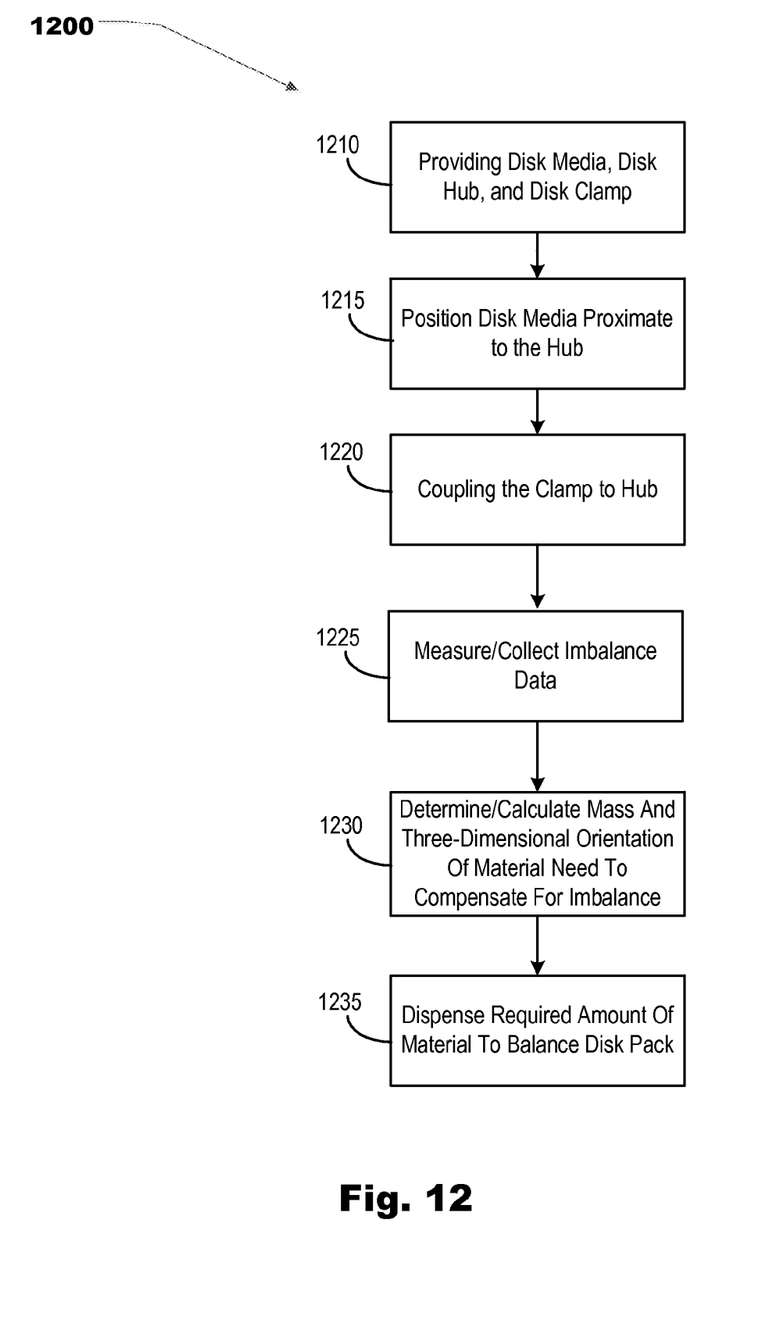
FIG. 12 illustrates a flowchart for a method of manufacturing and correcting imbalance of a disk drive, according to one or more example embodiments.

FIG. 12 illustrates a flow chart for a method 1200 of manufacturing a disk drive, according to at least one illustrated embodiment. This method 1200 will be discussed in the context of the hub 102 and the disk clamp 240 of FIGS. 2-7 and 11. However, the acts disclosed herein may be executed using a variety of different disk hubs and disk clamps, in accordance with the described method. For example, the acts disclosed herein may alternatively be executed using the hub 102 and the disk clamp 240 of FIGS. 8A-10B.

As described herein, at least some of the acts comprising the method 1200 may be orchestrated by a processor according to an automatic disk drive manufacturing algorithm, based at least in part on computer-readable instructions stored in computer-readable memory and executable by the processor. A manual implementation of one or more acts of the method 1200 may also be employed, in other embodiments.

At act 1210, a disk hub 102, a disk 104 and a disk clamp 240 are provided. The hub 102 may define a mounting surface (not labeled) and a cylindrical portion 108 having a vertical surface 202. In some embodiments, a plurality of threads may be formed in the vertical surface of the hub 102.

The disk clamp 240 may define a body 246, which in some embodiments may have a plurality of threads 242 formed on a radially inner surface thereof. Additionally, a groove 248 is formed in a surface of the body 246. Further, in some embodiments, the groove 248 extends in a circumferential direction substantially parallel to entire the circumference of the disk clamp 240. However, an exemplary embodiment is not limited to this configuration, and may instead extend substantially parallel to only a portion of the circumference of the disk clamp. Further, in the example embodiment illustrated in FIG. 3B, the groove 248 has a quasi-V-shaped cross-section with angled sidewalls 254 and a substantially flat bottom 250. However, the groove 248 may have alternative structures, such as the example structures shown in FIGS. 8A-10B.

The disk 104 may define an opening there through having an inner diameter. The disk 104 may be formed in a variety of ways. In one embodiment, the media of the disk 104 may be formed, and then the disk 104 may be stamped or otherwise machined to define the first opening.

The hub 102 may also be formed in a variety of ways. In one embodiment, the hub 102 may be machined to form the mounting surface, the cylindrical portion 108 and the vertical surface. In other embodiments, the hub 102 may be cast, molded or machined to form the mounting surface and the vertical surface. In still other embodiments, other manufacturing techniques may be employed.

Similarly, the manufacturing method of the disk clamp 240 is not particularly limited and may include machining, casting, molding, or any other methods as would be apparent to a person of ordinary skill in the art.

At act 1215, the disk 104 is positioned against the mounting surface of the hub 102. The cylindrical portion 108 of the hub 102 may be inserted through the opening formed in the disk 104 and the disk 104 may be positioned in physical contact with the mounting surface. In some embodiments, a machine vision system may help align the disk 104 and the mounting surface of the hub 102.

At act 1220, the disk clamp 240 is coupled to the disk hub 102 to provide a clamping force to the disk 104. Specifically, in the embodiment shown in FIGS. 3-7, the cylindrical portion 108 of the hub 102 may be inserted into the opening of the annularly shaped disk clamp 240. Further, in an embodiment of the disk clamp 240 having threads 242 formed on a radially inner region 244, the threads 242 may engage threads forms on the vertical surface of the cylindrical portion 108 of the hub 102. Further, the threads 242 of the disk clamp 240 may be rotated downward along the threads of the hub 102 until the disk clamp engages the disk 104 to provide a clamping force thereto.

At act 1225, after the disk clamp to 40 is coupled to the disk hub 102 to write a clamping force to the disk 104, imbalance of the disk pack assembly is measured to collect imbalance data for the assembled disk pack using methods that would be apparent to a person of ordinary skill in the art.

At act 1230, using the collected imbalance data, an amount of material and orientation, in three dimensions, necessary to correct the imbalance of the disk pack assembly is calculated using methods that would be apparent to a person of ordinary skill in the art.

At act 1235, a portion of material 400 is positioned at the required orientation to correct the imbalance of the disk pack assembly. Specifically, the portion of material 400 is positioned at a location within the groove 248 of the clamp 240 there was calculated in act 1230 as the necessary location to correct the imbalance calculated in act 1225. If the groove 248 extends parallel to the entire circumference of the clamp 240, the portion of material 400 can be positioned anywhere around the groove 248 to allow finer control of the placement of the portion of material 400 as compared to an embodiment that has a groove 248 that only extends parallel to a portion of the circumference of the clamp 248. Further, if the groove 248 has angular sidewalls 254, a curved bottom 850, a plurality of steps 952, 954, or an angled bottom 1050, as shown in FIGS. 3B, 8B, 9B, 10B, the vertical placement of the portion of material 400 may also be controlled to allow the imbalance of the disk pack assembly to be corrected in three dimensions by positioning the portion of material 400 at different positions both a vertical and horizontal directions.

The placement of the portion of material may be performed by an applying apparatus such as the apparatus shown in FIG. 11. Using an apparatus, such as the apparatus shown in FIG. 11, the injection nozzle 1101 may be positioned proximate to the area of the groove 248 to which the portion of the material 400 is to be added. As discussed above, the control device 1104 could then cause the supply material unit 1102 to supply a predefined amount of molten material to the injection nozzle 1108 and also cause the pressure/time unit 1106 pressure to the injection nozzle 1108 for a defined period of time to propel the supplied material out of injection nozzle and into the groove 248 of the clamp 242 to form the quantity of material 400.

However, an example method need not use the apparatus shown in FIG. 11, or any other apparatus. Additionally, the quantity of material 400 need not be provided in a molten state and instead could be a pre-formed portion of material that is attached to the groove 248 by adhesive.

The foregoing detailed description has set forth various embodiments of the devices and/or processes via the use of block diagrams, schematics, and examples. Insofar as such block diagrams, schematics, and examples contain one or more functions and/or operations, each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, the embodiments disclosed herein, in whole or in part, can be equivalently implemented in standard integrated circuits, as one or more programs executed by one or more processors, as one or more programs executed by one or more controllers (e.g., microcontrollers), as firmware, or as virtually any combination thereof.

While certain embodiments have been described, these embodiments have been presented by way of example only, and are not intended to limit the scope of the protection. Indeed, the novel methods and apparatuses described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection.

What is claimed is:

1. A disk drive assembly comprising:
 a disk hub comprising a central portion having a radially outer surface;
 a disk media; and
 a disk clamp that engages the disk hub to couple the disk media to disk hub,
 wherein the disk clamp comprises:
  a body portion having a hollow radially inner region forming an annular shape,
  wherein an inner surface proximate to the hollow radially inner region of the body portion is configured to engage the radially outer surface of the disk hub; and
  a groove formed in a surface of the body portion and extending in a circumferential direction substantially parallel to at least a portion of the circumference of the disk clamp; and
 a balance weight installed in the groove formed in the surface of the disk clamp,
 wherein the balance weight comprises a quantity of material applied in the groove.

2. The disk drive assembly according to claim 1, wherein the balance weight comprises a quantity of material applied in the groove in a molten state.

3. The disk drive assembly according to claim 2, wherein the quantity of material is applied to the groove by a solder jet.

4. The disk drive assembly according to claim 2, wherein the quantity of material is formed as a substantially spherical shape.

5. The disk drive assembly according to claim 2, wherein the quantity of material is formed as a substantially semi-spherical shape.

6. The disk drive assembly according to claim 2, wherein the quantity of material is formed as a substantially tear-drop shape.

7. The disk drive assembly according to claim 1, wherein the groove has a V-shaped cross section.

8. The disk drive assembly according to claim 1, wherein the disk hub comprises a threaded portion formed on the radially outer surface of the central portion; and
 wherein the inner surface of the body of the disk clamp proximate to the hollow region comprises a threaded region configured to engage the threaded portion of the disk hub.

9. The disk drive assembly according to claim 1, wherein the groove extends completely parallel to the circumference of the disk clamp to form a complete circle.

10. The disk drive assembly according to claim 1, wherein the disk clamp further comprises at least one notch formed on a radially outer surface of the cylindrical portion of the body.

11. The disk drive assembly according to claim 1, wherein the balance weight comprises a metallic bearing.

12. The disk drive assembly according to claim 11, wherein the metallic bearing is attached to the groove using adhesive.

13. A disk clamp configured to engage a disk hub to couple a disk media to a disk hub, wherein the disk clamp comprises:
    a body portion having a hollow radially inner region forming an annular shape,
    wherein an inner surface proximate to the hollow radially inner region of the body portion is configured to engage a radially outer surface of the disk hub; and
    a groove formed in a surface of the body portion and extending at least in a circumferential direction substantially parallel to at least a portion of the circumference of the disk clamp; and
    a balance weight installed in the groove formed in the surface of the disk clamp,
    wherein the balance weight comprises a quantity of material applied in the groove.

14. The disk clamp according to claim 13, wherein the balance weight comprises a quantity of material applied in the groove in a molten state.

15. The disk clamp according to claim 13, wherein the quantity of material is applied to the groove by a solder jet.

16. The disk clamp according to claim 13, wherein the quantity of material is formed as a substantially spherical shape.

17. The disk clamp according to claim 13, wherein the quantity of material is formed as a substantially semi-spherical shape.

18. The disk clamp according to claim 13, wherein the quantity of material is formed as a substantially tear-drop shape.

19. The disk clamp according to claim 13, wherein the groove has a V-shaped cross section.

20. The disk clamp according to claim 13,
    wherein the inner surface of the body of the disk clamp proximate to the hollow region comprises a threaded region configured to engage a threaded portion formed on the radially outer surface of the disk hub.

21. The disk clamp according to claim 13, wherein the groove extends completely parallel to the circumference of the disk clamp to form a complete circle.

22. The disk clamp according to claim 13, wherein the disk clamp further comprises at least one notch formed on a radially outer surface of the body.

23. The disk clamp according to claim 13, wherein the balance weight comprises a metallic bearing.

24. The disk clamp according to claim 23, wherein the metallic bearing is attached to the groove using adhesive.

* * * * *